(12) United States Patent
Heideman et al.

(10) Patent No.: US 7,142,759 B2
(45) Date of Patent: Nov. 28, 2006

(54) SURFACE WAVEGUIDE AND METHOD OF MANUFACTURE

(75) Inventors: Rene Gerrit Heideman, Oldenzaal (NL); Marcel Hoekman, Enschede (NL)

(73) Assignee: Lionix BV (NL)

( * ) Notice: Subject to any disclaimer, the term of this patent is extended or adjusted under 35 U.S.C. 154(b) by 68 days.

(21) Appl. No.: 11/034,119

(22) Filed: Jan. 12, 2005

(65) Prior Publication Data

US 2005/0180713 A1    Aug. 18, 2005

Related U.S. Application Data

(60) Provisional application No. 60/536,278, filed on Jan. 13, 2004, provisional application No. 60/536,099, filed on Jan. 13, 2004.

(51) Int. Cl.
  *G02B 6/10* (2006.01)
(52) U.S. Cl. ........................... 385/129; 385/132
(58) Field of Classification Search ..................... None
  See application file for complete search history.

(56) References Cited

U.S. PATENT DOCUMENTS

| | | | |
|---|---|---|---|
| 5,158,907 A * | 10/1992 | Fitzgerald | 438/504 |
| 5,238,877 A * | 8/1993 | Russell | 438/31 |
| 5,480,837 A * | 1/1996 | Liaw et al. | 438/626 |
| 5,719,976 A | 2/1998 | Henry et al. | |
| 6,403,393 B1 * | 6/2002 | Adkisson et al. | 438/31 |
| 6,850,670 B1 * | 2/2005 | Parhami et al. | 385/37 |
| 2001/0036705 A1 | 11/2001 | Nishida et al. | |
| 2003/0081902 A1 | 5/2003 | Blauvelt et al. | |
| 2003/0173208 A1 | 9/2003 | Pan et al. | |
| 2005/0074966 A1 * | 4/2005 | Rhodes | 438/629 |
| 2005/0133723 A1 * | 6/2005 | Lee et al. | 250/338.4 |

FOREIGN PATENT DOCUMENTS

EP    1293811 A2    3/2003

\* cited by examiner

*Primary Examiner*—Sung Pak
*Assistant Examiner*—Mike Stahl
(74) *Attorney, Agent, or Firm*—DeMont & Breyer, LLC (57) ABSTRACT

A surface waveguide is disclosed. In the illustrative embodiment, the waveguide has a core and an upper and lower cladding. The core has a thickness that is greater than the critical thickness of the material that composes the core. This is achieved by depositing/growing the core as a conformal layer within a region that is recessed from the planar surface of the lower cladding, wherein the recessed region has a width that is no more than twice the critical thickness of the core material.

19 Claims, 9 Drawing Sheets

SURFACE WAVEGUIDE AND METHOD OF MANUFACTURE

STATEMENT OF RELATED CASES

This case claims priority of U.S. Provisional Patent Application No. 60/536,278, filed Jan. 13, 2004, and U.S. Provisional Patent Application No. 60/536,099, filed Jan. 13, 2004, both of which are incorporated herein by reference.

FIELD OF THE INVENTION

The present invention relates to optical waveguides in general, and, more particularly, to surface waveguides.

BACKGROUND OF THE INVENTION

A surface waveguide is a light-guiding element, much like an optical fiber, which is formed on the surface of a rigid substrate. Surface waveguides are used for many applications including telecommunications, chemical sensing, and force sensing.

A surface waveguide is characterized as having a central region or "core" and a surrounding "cladding." An optical signal travels through a surface waveguide as an optical mode propagating through the core. The optical signal is substantially confined to the core by the cladding. The guiding property of a surface waveguide arises from a difference in the refractive index, n, between the core and the cladding. For a surface waveguide, the refractive index of the cladding is typically slightly lower than the refractive index of the core.

Surface waveguides can be fabricated in various forms including slab waveguides, ridge waveguides, and stripe waveguides. A slab waveguide comprises a planar thin film optical core sandwiched between two planar thin film claddings. The cladding above and below the core confine the propagating optical mode vertically, but not laterally.

A ridge waveguide is similar to a slab waveguide, but also includes a protruding ridge of material through which an optical mode propagates. The structure of the ridge substantially confines the mode both vertically and laterally, except where the ridge meets the slab. It is possible that a mode can exist in the slab area outside the ridge portion.

A stripe waveguide is essentially a ridge waveguide in which the slab portion has been etched away. The optical mode is confined to the stripe since there is no core material anywhere else.

Surface waveguide applications demand consistent optical and mechanical properties of the materials used in the waveguides. Surface waveguides have been formed from a variety of materials, including different types of glasses (e.g, silicon dioxide, boro-phosphosilicate glass, phosphosilicate glass, etc.), silicon nitrides, silicon oxy-nitrides, gallium arsenide, indium phosphide, silicon, and lithium niobate, or a combination thereof.

The surface waveguide is formed by successively depositing and appropriately patterning thin films of optical materials onto the surface of a substrate. Low pressure chemical vapor deposition (LPCVD) is a common method of forming the thin-film layers. In an LPCVD system, the glass is deposited onto the surface of a silicon wafer in high temperature furnaces into which different precursor gasses are injected, resulting in a chemical reaction that deposits glass on the surfaces of the silicon wafer.

Many LPCVD-deposited thin-films exhibit inherent residual stress and induced strain after deposition, primarily due to a mismatch of the coefficient of thermal expansion of the thin-film material and the substrate material. The magnitude of residual stress can increase with film thickness, which leads to higher induced strain. Above a certain "critical thickness," which is unique for each material, the induced strain in the film exceeds the fracture strain. The film therefore fractures, usually as it cools to room temperature from the elevated deposition temperatures (e.g., typically in the range of 500 to 1000° C.). As a consequence of this behavior, there is a limit to the thickness to which many thin-film materials can be deposited.

Thin films that are formed from either stoichiometric silicon nitride ($Si_3N_4$) or TEOS (silicon dioxide deposited using tetraethylorthosilicate as a precursor gas), are highly desirable for use as waveguide cores due to their consistent properties and lack of light-scattering centers. Unfortunately, these materials are subject to the aforementioned critical-thickness constraint, thereby limiting their utility for use in surface waveguides. In particular, thin films formed from stoichiometric silicon nitride are limited to a thickness of about 350 nm and thin films formed from TEOS have critical thickness limitation of about 1850 nm. In many instances, it is desirable to have core cross sections that exceed these critical thicknesses in both dimensions (e.g., to facilitate coupling to optical fibers or active devices such as lasers or detectors, etc.).

SUMMARY OF THE INVENTION

The illustrative embodiment of the present invention is a surface waveguide, and a method for making it, which avoids some of the shortcomings of the prior art.

A surface waveguide in accordance with the illustrative embodiment includes an optical core that has dimensions that exceed the critical thickness of the material that comprises the core. Obtaining greater-than-critical-thickness dimensions is accomplished by (1) depositing core material such that a conformal layer results and (2) by forming the conformal layer in a recess that has an appropriate width. In accordance with the illustrative embodiment, an "appropriate" width is a width that is no greater than twice the critical thickness of the core material.

The conformal layer will fill the recess from the sidewalls inward. As a consequence, to fill a recess having a width that is equal to twice the critical thickness, the material need only deposit to a thickness that is equal to one times the critical thickness on each wall. The two layers, each having a thickness equal to the critical thickness, will meet along the centerline of the recess, completely filling it. Since it is acceptable to deposit material to a thickness up to and including the critical thickness, the material that is deposited within the recess will be of acceptable quality. If the recess is any wider than twice the critical thickness, the recess cannot be filled completely.

It is notable that recess can be made arbitrarily deep as long as its width is no greater than twice the critical thickness of the core material. In other words, even if the depth of the recess exceeds the critical thickness, the recess can be completely filled with core material. As explained above, this is because the recessed region fills from the sidewalls inward. As a consequence, there is no deposition-related limit on the depth of recess.

As a result of this approach, a waveguide structure having a core of stoichiometric silicon nitride or TEOS-based silicon dioxide can be formed that would be otherwise unattainable due to cracking caused by internal stress and strain.

DETAILED DESCRIPTION

Figure 1:
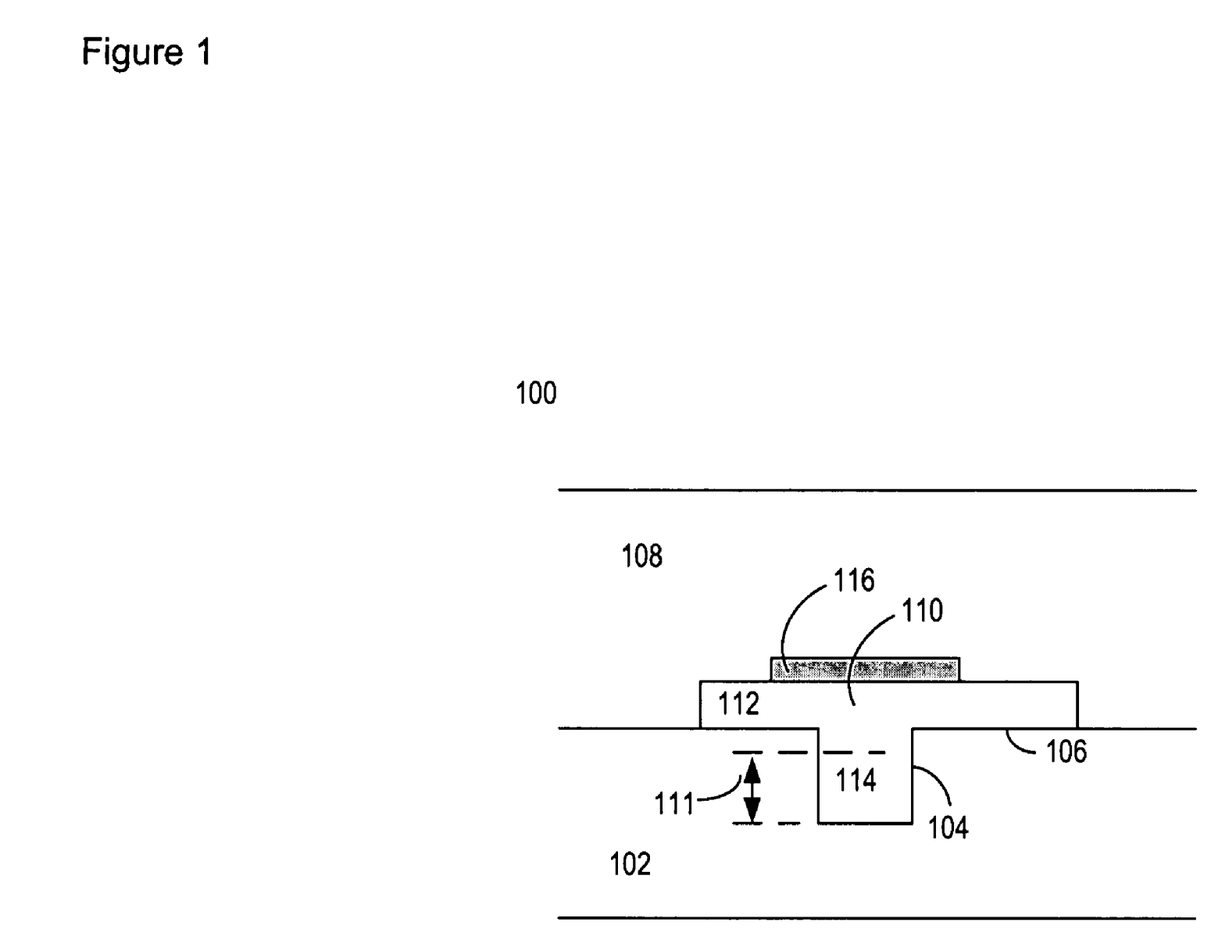
FIG. 1 depicts a cross-sectional view of a waveguide in accordance with the illustrative embodiment of the present invention.

FIG. 1 depicts a cross-sectional view of a portion of inverted-ridge waveguide 100 in accordance with the illustrative embodiment of the present invention. Inverted-ridge waveguide 100 comprises core 110, lower cladding 102, and upper cladding 108.

Lower cladding 102 has a generally planar surface, with the exception of recess 104. The surface of lower cladding 102 on either side of recess 104 is referred to as "field region" 106.

Core 110 comprises slab 112 and inverted ridge 114. The inverted ridge is disposed in recess 104. As described later in this specification, the width and height of inverted ridge 114 are determined by the width and depth of recess 104.

In the illustrative embodiment, inverted-ridge waveguide 100 includes optional layer 116 of electro-optically-active material. In some embodiments layer 116 is disposed on core 110. In such embodiments, layer 116 is functionally part of the core since it supports propagation of the optical signal. In some other embodiments, some or all of core 110 is removed and replaced by layer 116. Layer 116 will be described in further detail later in this specification.

The material(s) that compose lower cladding 102 and upper cladding 108 have a refractive index that is lower than material that composes core 110. By virtue of this difference in refractive indices and the geometry of core 100 and recess 104, the lower and upper cladding confine light that is propagating through inverted ridge 114.

Within core 110, the lateral extent of slab 112 beyond the sides of inverted ridge 114 is determined by design constraints for the inverted ridge waveguide, such as the desired optical mode shape or desired stress configuration in inverted ridge 114. By removing slab 112, such that only inverted ridge 114 remains, the inverted ridge waveguide becomes a stripe waveguide.

The material that composes core 110 is characterized by critical thickness $T_c$. As depicted in FIG. 1, depth $D_r$ and width $W_r$ of ridge 114 exceeds critical thickness $T_c$.

As discussed in the background, cracking of a thin-film occurs when the induced strain in the film exceeds the fracture strain of the material, which occurs above a "critical thickness" for that material. The present invention avoids this cracking phenomenon for films that are thicker than critical thickness $T_c$ by:

Depositing core material such that a conformal layer results; and

Forming the conformal layer in a recess (e.g., recess 104, etc.) that has an appropriate width.

These points are described further below.

As is well known in the art, in a "conformal" layer, the thickness of the deposited film is nearly uniform over underlying structure. For example, a conformal layer will coat the bottom and sidewalls of a recess with roughly the same amount of material, filling the recess from both the bottom and sides as it is grown. Only certain gas mixtures or materials are known to result in conformal layers.

Figure 2A:
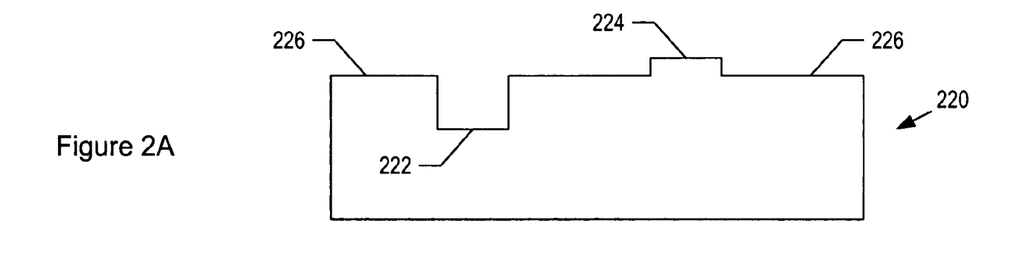
FIGS. 2A–2C depict the deposition of a conformal layer.
Figure 2B:
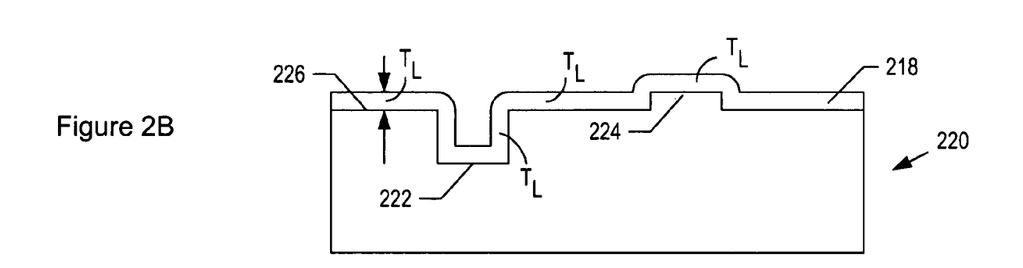
Figure 2C:
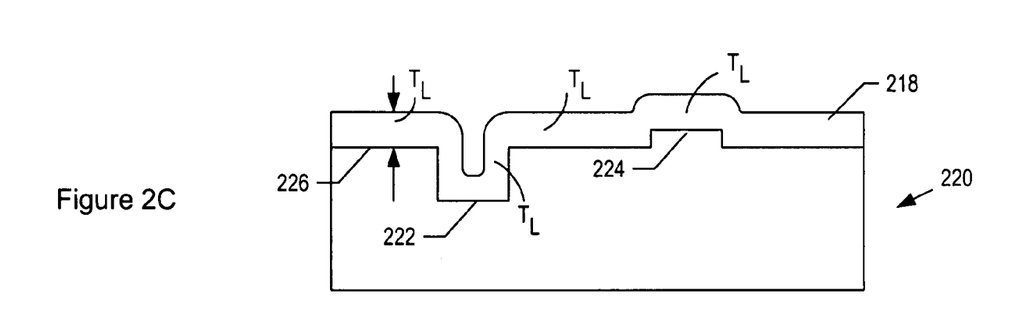

FIGS. 2A–2C depict layer 218 of material being deposited over a surface 220. These Figures show the success growth of conformal layer 218, wherein the thickness $T_L$ of the layer is substantially uniform regardless of underlying features (e.g., recess 222, ridge 224, planar region 226, etc.). The way in which conformal deposition is used to exceed the critical thickness of thin film is described below.

Figure 3:
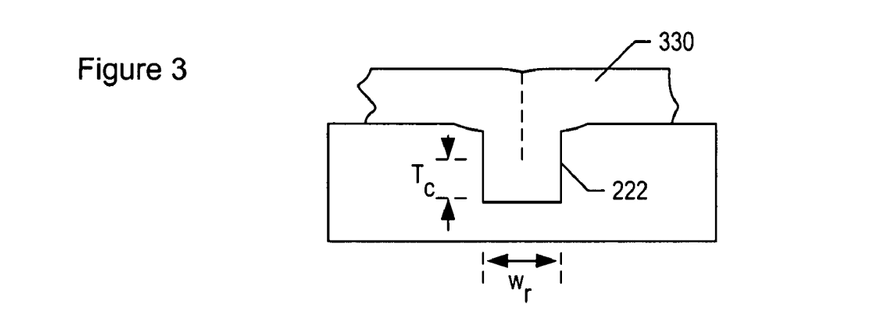
FIG. 3 depicts a recess, wherein the recess is suitable for creating a greater-than-critical-thickness layer.

Referring now to FIG. 3, to create film 330 that has a thickness that exceeds the critical thickness $T_c$ for that material in one dimension, the film is deposited in recess 222 having a width, $W_r$, wherein:

$$W_r \leq 2T_c \quad (1)$$

That is, the width of the recess must be no greater than twice the critical thickness. This result is described further below with reference to FIGS. 4A–4B.

Figure 4A:
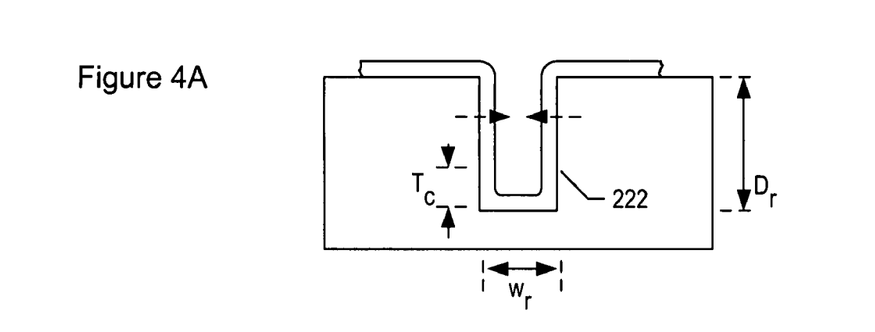
FIGS. 4A and 4B depict the formation of a layer of material that has a thickness that is greater than the critical thickness of the material.
Figure 4B:
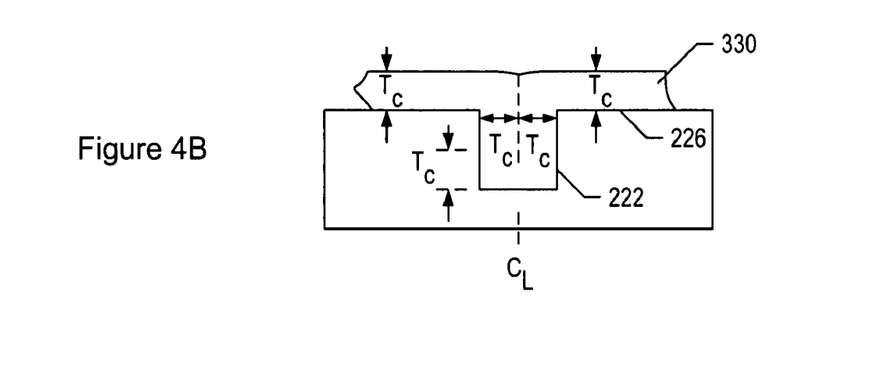

Referring now to FIGS. 4A–4B, width $W_r$ of recess 222 equals twice the critical thickness. As depicted in FIG. 4A, the material fills recess 222 from the sidewalls inward. As a consequence, to fill recess 222 having width $W_r=2T_c$, the material will deposit to thickness $T_L=T_c$ on each wall, meeting along centerline $C_L$ of recess 222, as depicted in FIG. 4B. Since it is acceptable to deposit material to a thickness up to and including the critical thickness, the material that is deposited within recess 222 will be acceptable.

Furthermore, since the material deposits to substantially the same thickness everywhere over the underlying surface, the thickness of layer 330 on planar field region 226 will not exceed critical thickness $T_c$ when recess 222 is completely filled. In fact, with $W_r=2T_c$, the thickness $T_L$ of the layer 330 in planar field region 226 will be at the critical thickness $T_c$.

It is notable that depth $D_r$ of recess 222 can be made arbitrarily deep as long as $W_r \leq 2T_c$. In other words, even if depth $D_r$ of recess 222 exceeds the critical thickness, the recess can be completely filled with material. Again, this is because the recessed region fills from the sidewalls inward. As a consequence, there is no deposition-related limit on the depth of recess 222. Of course, in the case of a specific design for a surface waveguide, the depth of recess 222 is dictated by optical design parameters (since the dimensions of the recess determine the dimensions of ridge).

To create film 330 that has a thickness $T_L$ that exceeds the critical thickness $T_c$ for that material in two dimensions (i.e., vertically and laterally), the film is deposited in a recess having width $W_r$, wherein:

$$T_c < W_r \leq 2T_c \quad (2)$$

In other words, the width of the recess must be greater than the critical thickness, but no greater than twice the critical thickness.

Materials suitable for use as the core of a surface waveguide in accordance with the present invention must:

support optical signal propagation;
exhibit a critical thickness beyond which cracking will occur; and
can deposit as a conformal layer.

A list of suitable materials includes, without limitation, stoichiometric silicon nitride, polycrystalline silicon, and TEOS.

Figure 5:
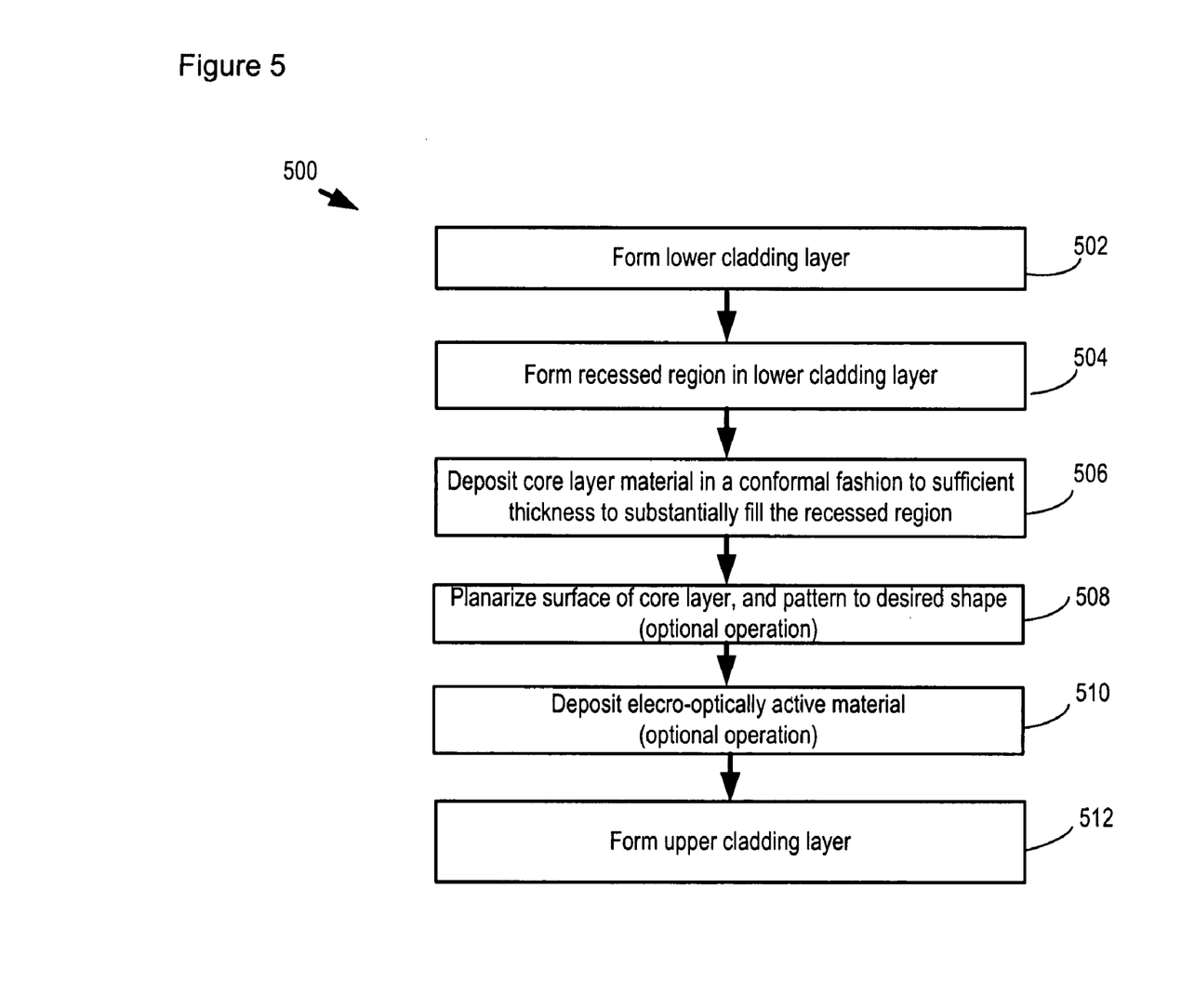
FIG. 5 depicts a method for forming a waveguide in accordance with the illustrative embodiment of the present invention.

FIG. 5 depicts method 500 for forming a waveguide having a core layer with a region thicker than the critical thickness of the material composing the core layer. An example of such a region is inverted ridge 114, as depicted in surface waveguide 100 of FIG. 1. The operations recited in method 500 are depicted in FIGS. 6A–6H, which shows the successive formation of waveguide 600.

Figure 6A:
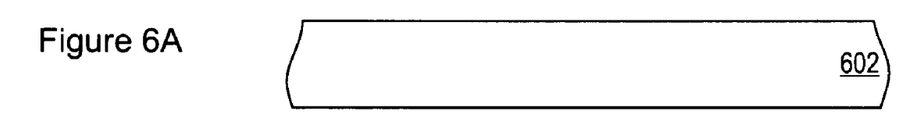
FIGS. 6A–6H depict the formation of a waveguide using the method of FIG. 5.

Method 500 recites, in operation 502, forming a lower cladding layer. FIG. 6A depicts lower cladding 602. In some embodiments, the lower cladding layer comprises silicon dioxide.

It will be clear to those skilled in the art, after reading this specification, how to make and use other embodiments of the present invention wherein the lower cladding layer comprises a material selected from the following non-exhaustive list: stoichiometric and non-stoichiometric compounds of silicon nitride, TEOS, polysilicon, silicon carbide, silicon monoxide, silicon-rich silicon nitride, indium phosphide, gallium arsenide, indium-gallium arsenide, indium-gallium-arsenide-phosphide, lithium niobate, silicon oxynitride, phosphosilicate glass, borosilicate glass, and borophosphosilicate glass.

Figure 6B:
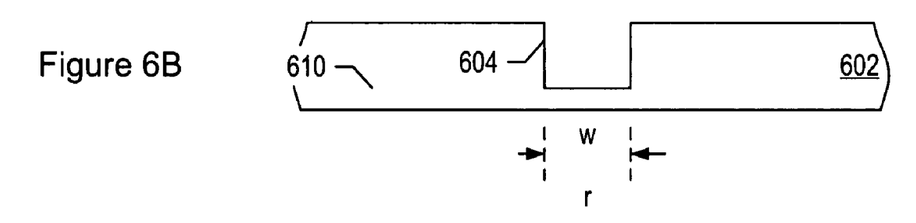

In operation 504, a recess is formed in the lower cladding layer. FIG. 6B depicts recess 604 within lower cladding 602. The recess is formed using any of a variety of techniques known to those skilled in the art, such as reactive ion etching, deep reactive ion etching, ion milling, wet etching, etc.

It is desirable to have a slightly positive etch angle in recess 604 (i.e., the recess is slightly wider at the top than at the bottom). The reason for this is that slightly (or greater) negative etch angles (i.e., wherein the recess is wider at the bottom than at the top) result in voids within recess 604 as it fills. Furthermore, it should be understood that while recess 604 is shown to be rectangular, other shapes are not prohibited. For example, in some embodiments, recess 604 has a trapezoidal shape (which is consistent with the positive etch angle). Other shapes are possible, as well.

Width $W_r$ of the recess is determined by the critical thickness $T_c$ of the material that is to be used for the optical core. Width $W_r$ of recess 604 no greater than twice the value of the critical thickness of that material.

Figure 6C:
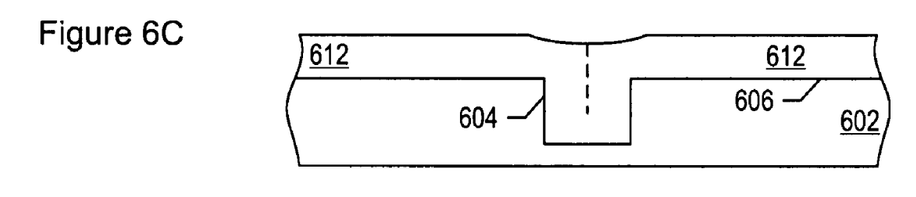

In operation 506, the material that is to form the core is deposited to form a conformal layer that substantially fills the recess of the lower cladding layer. This is depicted in FIG. 6C. As inverted ridge 614 of core material deposits in recess 604, core layer material also deposits on planar field region 606 of lower cladding 602, forming slab 612. Both inverted ridge 614 and slab 612 are part of core 610.

In optional operation 508, core 610 is planarized and patterned, as appropriate.

Figure 6D:
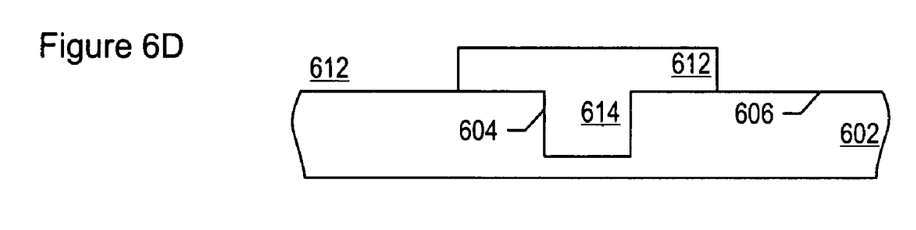

Planarization of the surface of core 610—more particularly, the surface of slab 612—improves optical propagation in the surface waveguide. As is well known to those skilled in the art, planarization is performed using chemical-mechanical polishing, or other techniques. As desired, core 610 is patterned, using standard photolithographic techniques, to limit the distance that slab 612 extends beyond the edges of inverted ridge 614. FIG. 6D depicts slab 612 after patterning to remove a portion of the core material.

Figure 6E:
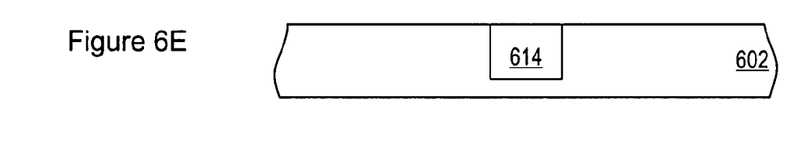

In some embodiments, core material is removed from all areas except ridge 614, thereby forming a channel or stripe waveguide. This is depicted in FIG. 6E.

Figure 6F:
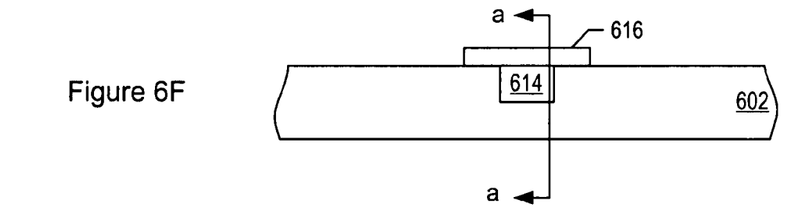
Figure 6G:
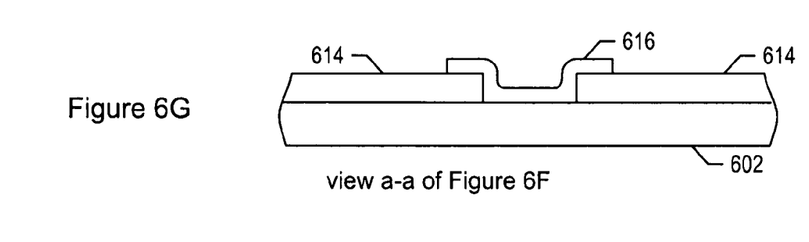

In a second optional operation—operation 510—an electro-optic functionality is added to the nascent waveguide. In some embodiments, operation 510 comprises depositing or growing, and then patterning, a layer of electro-optically active material as a part of the core. FIGS. 6F and 6G (an end view and side view, respectively, of an electro-optically active waveguide) depict layer 616, which comprises an electro-optically active material, on top of and as part of stripe waveguide 614. Suitable electro-optic materials include without limitation, zinc-oxide (ZnO), lead-zirconium titanate (PZT), lanthanum-doped PZT (PLZT), barium titanate, lithium niobate, and electro-optic polymers. In some embodiments, the electro-optically active material is zinc-oxide, which can be used to induce electro-optic effects, such as piezo-electric, photo-elastic, acousto-optical effects in response to an applied electric voltage.

Figure 6H:
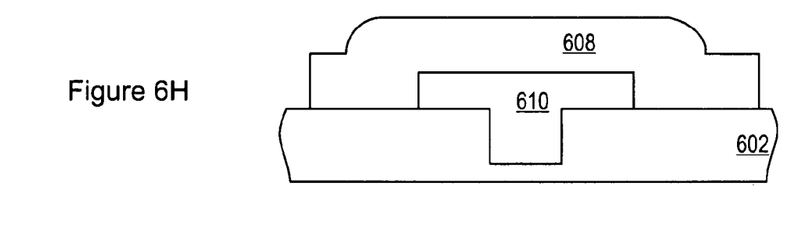

In operation 512, an upper cladding layer is deposited or grown on the core (and/or layer of electro-optically active material, if present) as well as over the lower cladding layer. FIG. 6H depicts upper cladding 608 overlying core 610 and portions of lower cladding 602.

Optionally, after the formation of each or some layers (especially after formation of inverted ridge 614) in method 500, an annealing operation is performed. This will remove any voids, etc., that are present in the layers In some embodiments, the upper and lower cladding layers are formed of the same material, while in some other embodiments, different materials are used for the two layers.

In embodiments in which surface waveguide 600 is to be used for telecommunication applications, it will be particularly desirable to use materials that have low attenuation characteristics, such as stoichiometric silicon nitride and silicon-dioxide formed from TEOS. In many other applications, however, loss characteristics are not as important and a variety of other materials, such as those listed as suitable for the cladding layers, are suitably used. Those skilled in the art will know how to select material for use as the core layer and the cladding layers for any particular application.

Figure 7:
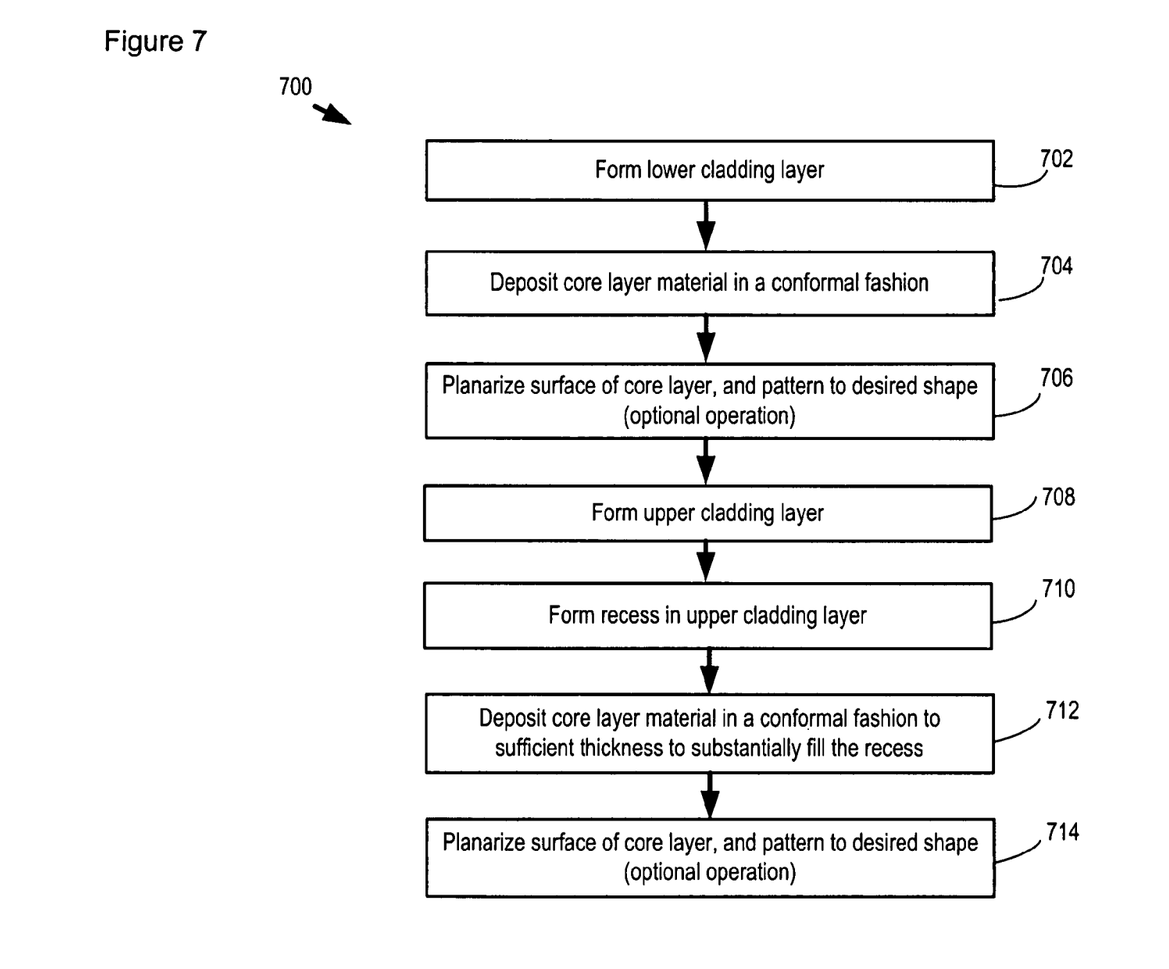
FIG. 7 depicts a variation of the method of FIG. 5.
Figure 8A:
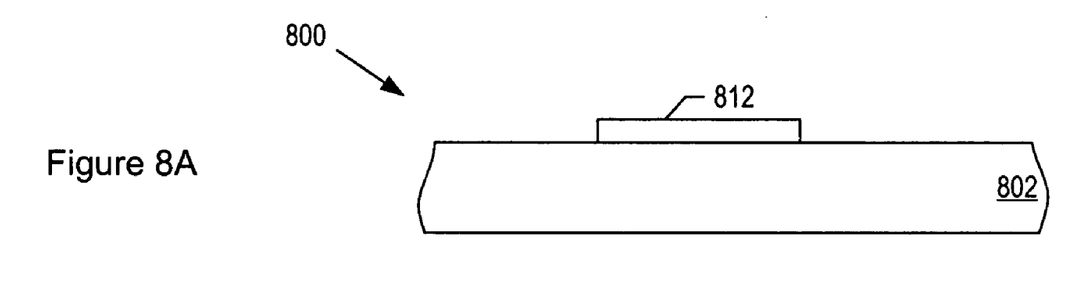
FIGS. 8A–8C depict the formation of a waveguide using the method that is shown in FIG. 7.
Figure 8B:
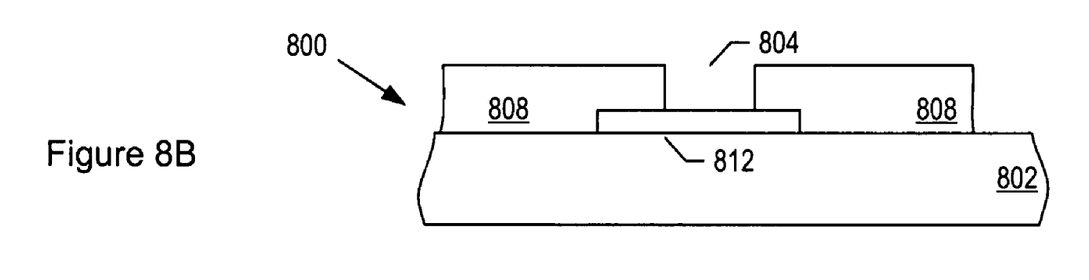
Figure 8C:
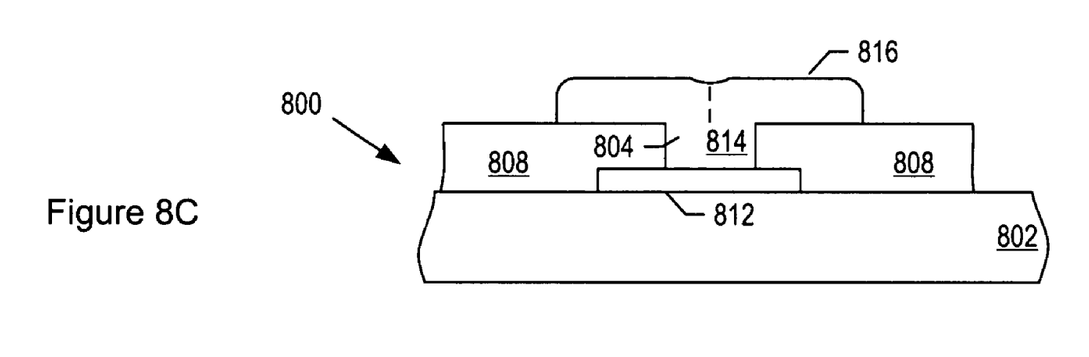

Method 500 is suitable for forming inverted ridge and stripe waveguides. The techniques used in method 500 can be adapted to form a raised-ridge waveguide, wherein the ridge is disposed above the slab. This modification is depicted in FIG. 7 as method 700. Some of the operations recited in method 700 are depicted in FIGS. 8A–8C, which shows the formation of raised ridge waveguide 800.

In operation 702, a lower cladding layer is formed, as in the first operation of method 500. After the lower cladding layer is formed, a layer of core material is grown or deposited, as per operation 704. In optional operation 706, the core material is planarized and patterned, as appropriate. FIG. 8A depicts nascent raised-ridge waveguide 800, wherein patterned slab 812 is disposed on lower cladding 802.

In operation 708, an upper cladding layer is deposited or grown on the slab 812 and lower cladding 802. In operation 710, a recess is formed in the upper cladding layer. The width of the recess is determined by the critical thickness $T_c$ of the material that is to be used for the optical core, but is no greater than twice the value of that critical thickness. FIG. 8B depicts recess 804 in upper cladding 808.

In operation 712, the material that is to form the ridge of the core is deposited to form a conformal layer that substantially fills the recess in the upper cladding layer. As core material deposits in the recess, core material also deposits on top of the upper cladding. FIG. 8C depicts raised ridge 814 within recess 804 and layer 816 of core material on top of upper cladding 808.

In optional operation 714, the raised-ridge waveguide is planarized and patterned. In some embodiments, layer 816 of core material on upper cladding 808 is removed. In yet some additional embodiments, upper cladding 808 that surrounds raised ridge 814 is removed, so that the ridge is "air cladded."

Figure 9:
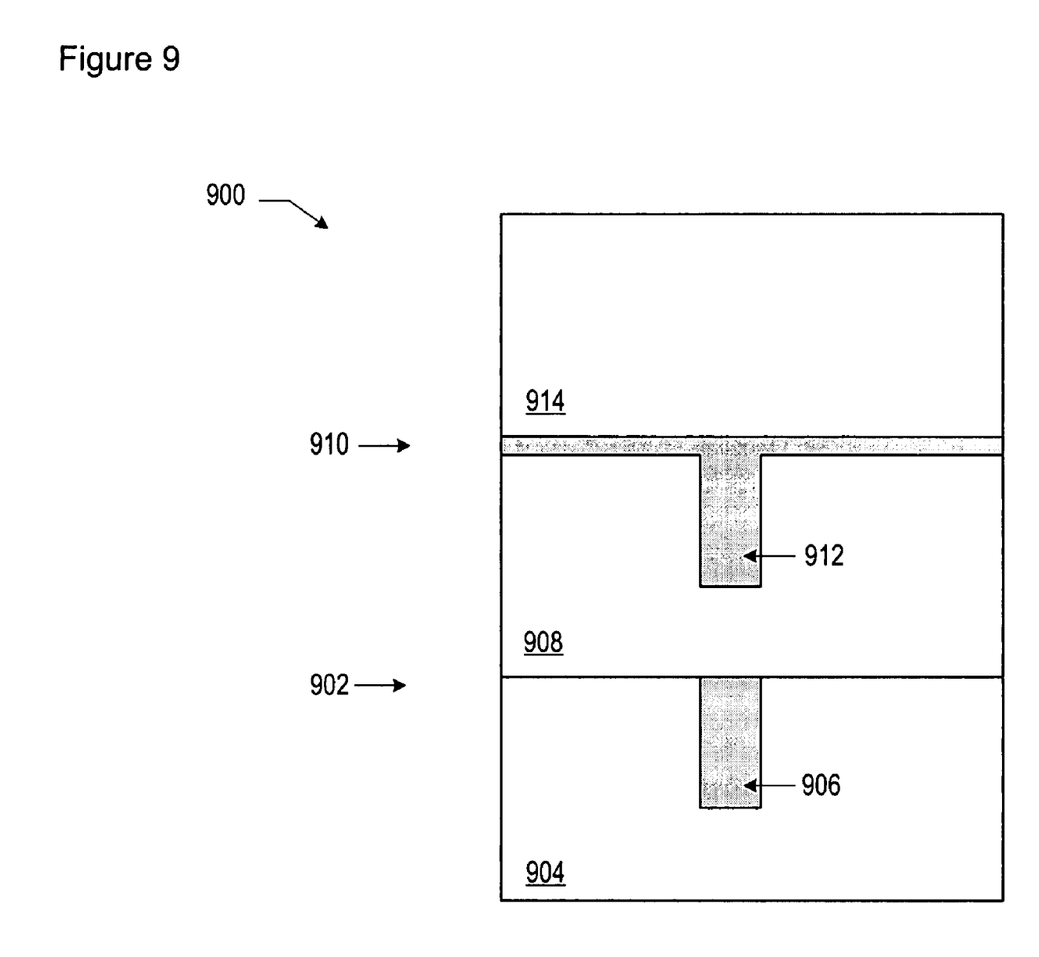
FIG. 9 depicts a multi-level waveguide.

The method described herein can be used to form a multi-level waveguide, as depicted in FIG. 9.

Multi-level waveguide 900 comprises lower stripe waveguide 902 and an upper inverted-ridge waveguide 910, wherein both waveguides are formed by method 500. Stripe waveguide 902 comprises layer 904, core 906 in the form of a stripe, and layer 908. Layers 904 and 908 together form the cladding of stripe waveguide 902.

Inverted-ridge waveguide 910 comprises layer 908, core 912 in the form of an inverted ridge, and layer 914. Layers 908 and 914 together form the cladding of inverted-ridge waveguide 910.

It is notable that layer 908 is a dual-use layer; it serves as the upper cladding for stripe waveguide 902 as well the lower cladding for inverted-ridge waveguide 910.

In some embodiments, layer 908 is silicon dioxide that is deposited using "plasma-enhanced chemical vapor deposition (PECVD)," which is a low-temperature thin-film deposition process. By virtue of the lower deposition temperature, thin-films deposited using PECVD deposition can be made thicker than films of the same material deposited using LPCVD deposition. Additionally, layer 908 can be formed using TEOS as a precursor in the PECVD deposition process. PECVD deposition is non-conformal, but a conformal layer is not required for the lower or upper cladding. It is notable that the optical quality of PECVD-deposited films is lower than LPCVD-deposited films.

Multi-level waveguide 900 combines a stripe waveguide and an inverted-ridge waveguide that are formed using the illustrative method. In some other embodiments, multi-level waveguides are formed that include at least one type of waveguide that is formed using the methods described. Examples of other embodiments of multi-level waveguides include, without limitation:

a plurality of ridge waveguides; or
a plurality of inverted-ridge waveguides; or
a plurality of stripe waveguides; or
any of the above in combination with a slab waveguide; or
at least one of each of two or more different types of waveguides mentioned above.

It will be clear to those skilled in the art, after reading this specification, how to make and use the other types of multi-level waveguides indicated above.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising forming a first conformal layer of a first material in a first recess within a first layer, wherein:
   said first conformal layer substantially fills said first recess;
   said first material is characterized by a first critical thickness;
   a width of said first recess is no greater than twice said first critical thickness; and
   said first material is selected from the group consisting of stoichiometric silicon nitride and silicon dioxide that is deposited using tetraethylorthosilicate as a precursor gas in a low pressure chemical vapor deposition process.

2. The method of claim 1 wherein said width of said first recess is at least said first critical thickness.

3. The method of claim 1 wherein said first recess has a depth that is greater than said first critical thickness.

4. The method of claim 1 further comprising forming said first layer.

5. A method comprising:
   forming a first conformal layer of a first material in a first recess within a first layer; and
   forming a second layer over said first conformal layer, wherein:
   (i) said first conformal layer substantially fills said first recess;
   (ii) said first material is characterized by a first critical thickness;
   (iii) a width of said first recess is no greater than twice said first critical thickness;
   (iv) said first layer comprises a second material;
   (v) said second layer comprises a third material, and
   (vi) said second material and said third material are individually selected from the group consisting of stoichiometric and non-stoichiometric compounds of silicon nitride, TEOS, silicon carbide, silicon monoxide, silicon-rich silicon nitride, indium phosphide, gallium arsenide, indium-gallium arsenide, indium-gallium-arsenide-phosphide, lithium niobate, silicon oxy-nitride, phosphosilicate glass, borosilicate glass, and boro-phosphosilicate glass.

6. A method comprising:
   forming a first conformal layer of a first material in a first recess within a first layer;
   forming a second layer over said first conformal layer, wherein:

said first conformal layer substantially fills said first recess;

said first material is characterized by a first critical thickness;

a width of said first recess is no greater than twice said first critical thickness;

forming a second recess in said second layer; and forming a second conformal layer of a second material in said second recess, wherein:

said second conformal layer substantially fills said second recess;

said second material is characterized by a second critical thickness; and a width of said second recess is no greater than twice said second critical thickness.

7. The method of claim 6 wherein said width of said first recess is at least said first critical thickness and said width of said second recess is at least said second critical thickness.

8. A method comprising:

forming a first conformal layer of a first material in a first recess within a first layer; and forming a layer of an electro-optically active material on said first conformal layer, wherein:

said first conformal layer substantially fills said first recess;

said first material is characterized by a first critical thickness; and a width of said first recess is no greater than twice said first critical thickness.

9. A method comprising:

forming a first conformal layer of a first material in a first recess within a first layer; and removing at least a region of said conformal layer and forming a layer of an electro-optically active material in said region, wherein:

said first conformal layer substantially fills said first recess;

said first material is characterized by a first critical thickness; and a width of said first recess is no greater than twice said first critical thickness.

10. A waveguide comprising a core, wherein:

said core comprises a first material that is suitable for propagating an optical signal;

said first material is characterized by a critical thickness;

a portion of said core has a width that is no more than twice said critical thickness;

the height of said portion of said core is greater than said critical thickness; and said core comprises a material selected from the group consisting of stoichiometric silicon nitride and silicon dioxide that is deposited using tetraethylorthosilicate as a precursor gas in a low pressure chemical vapor deposition process.

11. The waveguide of claim 10 further comprising a lower cladding, wherein said lower cladding comprises a recess, and wherein said recess is filled with said first material, and wherein said recess has a width that is no more than twice said critical thickness, and further wherein a height of said recess is greater than said critical thickness.

12. The waveguide of claim 10 wherein said core comprises a slab and a ridge, and wherein said ridge is said portion of said core that has a height that is greater than said critical thickness.

13. The waveguide of claim 10 wherein said portion of said core has a width that is greater than said critical thickness.

14. A waveguide comprising:

a core;

a lower cladding, wherein said core is disposed on said lower cladding;

an upper cladding, wherein said upper cladding is disposed on at least a portion of said core; and a second core, wherein said second core is disposed on said upper cladding, wherein:

(i) said core comprises a first material that is suitable for propagating an optical signal;

(ii) said first material is characterized by a critical thickness;

(iii) a portion of said core has a width that is no more than twice said critical thickness;

(iv) said height of said portion of said core is greater than said critical thickness;

(v) said second core comprises a second material that is suitable for propagating an optical signal.

15. An article comprising:

a first surface waveguide comprising:

a core, wherein said core comprises a first material suitable for propagating an optical signal, and wherein said first material has a critical thickness, and further wherein a width of said core is within a range of one to two times said critical thickness;

a first lower cladding layer, wherein said first lower cladding layer is disposed beneath at least a portion of said core; and a first upper cladding layer, wherein said first upper cladding layer is disposed above said first lower cladding layer; and a second surface waveguide comprising:

a core, wherein said core comprises a second material suitable for propagating an optical signal; and a second lower cladding layer, wherein said second lower cladding layer is disposed beneath at least a portion of said core of said second surface waveguide, and further wherein said first upper cladding layer and said second lower cladding layer are the same layer.

16. The method of claim 5 wherein said width of said first recess is at least said first critical thickness.

17. The method of claim 5 wherein said first recess has a depth that is greater than said first critical thickness.

18. The method of claim 8 wherein said first material is suitable for propagating an optical signal.

19. The method of claim 9 wherein said first material is suitable for propagating an optical signal.

* * * * *